(12) United States Patent
Ashbrook et al.

(10) Patent No.: US 9,223,782 B2
(45) Date of Patent: Dec. 29, 2015

(54) SYSTEM FOR PERFORMING INSTRUCTIONS THAT ARE DEPENDENT UPON RECEIVED MEDIA-BASED MESSAGES AND ASSOCIATED METHODS AND COMPONENTS

(75) Inventors: Anthony Ashbrook, Edinburgh (GB); Maurizio Pilu, London (GB)

(73) Assignee: Mobile Acuity Limited, Edinburgh (GB)

( * ) Notice: Subject to any disclaimer, the term of this patent is extended or adjusted under 35 U.S.C. 154(b) by 687 days.

(21) Appl. No.: 12/734,077

(22) PCT Filed: Oct. 13, 2008

(86) PCT No.: PCT/EP2008/063738
§ 371 (c)(1),
(2), (4) Date: Oct. 21, 2010

(87) PCT Pub. No.: WO2009/047364
PCT Pub. Date: Apr. 16, 2009

(65) Prior Publication Data
US 2011/0035394 A1      Feb. 10, 2011

(30) Foreign Application Priority Data
Oct. 11, 2007   (GB) .................................. 0719850.0

(51) Int. Cl.
*G06F 17/30*            (2006.01)
(52) U.S. Cl.
CPC ........ *G06F 17/3002* (2013.01); *G06F 17/3087* (2013.01); *G06F 17/30247* (2013.01); *A63F 2300/1093* (2013.01)
(58) Field of Classification Search
CPC ................................................. G06F 17/30247
USPC ..................... 707/E17.02, 758, 772
See application file for complete search history.

(56) References Cited

U.S. PATENT DOCUMENTS 5,918,223 A    6/1999    Blum et al. ........................ 707/1
(Continued)

FOREIGN PATENT DOCUMENTS

| WO | WO 03/041000 A1 | 5/2003 |
| WO | WO 2006/085106 A1 | 8/2006 |
| WO | WO 2007/021996 A2 | 2/2007 |
| WO | WO 2007/104348 A1 | 9/2007 |

OTHER PUBLICATIONS

Ke, Y., et al., "PCA-SIFT: A More distinctive Representation for Local Image Descriptors", 2004 Proc. of the CVPR, vol. 2, pp. 506-513.

(Continued)

*Primary Examiner* — Robert Beausoliel, Jr.
*Assistant Examiner* — Nirav K Khakhar
(74) *Attorney, Agent, or Firm* — Harrington & Smith (57) ABSTRACT

A system for performing instructions determined by received media-based messages, the system including an interface for receiving a media-based message from a system user; a database associating a plurality of specifications of media-based messages with respective stored instructions; a recognition engine for identifying a correspondence between a received media-based message and a stored specification of a media-based message. The system may include an instruction engine for performing an instruction associated with a stored specification of an media-based message for which a correspondence has been identified; an interface for receiving an activation request; and a database manager configured to process the activation request to generate publication data for creating a publication that may be recorded by a user to define a new media-based message and configured to adapt the database to include a specification of the new media-based message. The system may include a database manager configured to arbitrate which of plural stored instructions is performed in response to an identified correspondence between the received media-based message and one or more specifications of media-based messages.

22 Claims, 4 Drawing Sheets

(56) References Cited

U.S. PATENT DOCUMENTS

| | | | |
|---|---|---|---|
| 7,761,466 B1* | 7/2010 | Eshghi | 707/772 |
| 2005/0162523 A1 | 7/2005 | Darrell et al. | 348/211.2 |
| 2006/0218115 A1* | 9/2006 | Goodman et al. | 707/1 |
| 2007/0071290 A1 | 3/2007 | Shah et al. | 382/118 |
| 2007/0104348 A1 | 5/2007 | Cohen | 382/100 |
| 2007/0172155 A1* | 7/2007 | Guckenberger | 382/305 |

OTHER PUBLICATIONS

Kirovski, D., et al., "Spread-Spectrum Watermarking of Audio Signals", 2003 IEEE Transactions on Signal Processing: Special Issue on Data Hiding, 13 pgs.

Chen, Y-S., et al., "A Mobile Butterfly-Watching Learning System for Supporting Independent Learning", © 2004 IEEE, 8 pgs.

\* cited by examiner

SYSTEM FOR PERFORMING INSTRUCTIONS THAT ARE DEPENDENT UPON RECEIVED MEDIA-BASED MESSAGES AND ASSOCIATED METHODS AND COMPONENTS

FIELD OF THE INVENTION

Embodiments of the present invention relate to a system for performing instructions that are dependent upon received media-based messages and associated methods and components.

BACKGROUND TO THE INVENTION

Systems for performing instructions that are dependent upon received media-based messages are known.

For example, WO2006085106 describes a system in which an image may be used to address content which is then delivered to a user. One of a plurality of different users can bind information (digital content) to any location in the world by taking an image of that location. The digital content then notionally exists at that location and can be collected by the same user or a different user by taking an image of that location.

It would be desirable to provide an improved system that can perform instructions dependent upon received media-based messages.

BRIEF DESCRIPTION OF VARIOUS EMBODIMENTS OF THE INVENTION

Various embodiments of the invention are defined in the appended claims.

According to some embodiments there is provided a system for performing instructions determined by received media-based messages, the system comprising: an interface for receiving a media-based message from a system user; a database associating a plurality of specifications of media-based messages with respective stored instructions; a recognition engine for identifying a correspondence between a received media-based message and a stored specification of a media-based message; an instruction engine for performing an instruction associated with a stored specification of an media-based message for which a correspondence has been identified; an interface for receiving an activation request; and a database manager configured to process the activation request to generate publication data that enables generation of a publication that may be recorded by a user to define a new media-based message and configured to adapt the database to include a specification of the new media-based message.

The system allows a user to control 'activation' of a publication by binding an instruction to physical instantiations of that publication. The instruction then notionally exists at the publication and can be executed by the same user or a different user by them recording the publication and sending it in a media-based message to the system.

Active processing of the activation request provides numerous advantages. An unskilled user may be able to 'activate' in a simple manner a publication based upon media-content they have provided. The system intelligently processes the request and automatically assists the unskilled user in effectively 'activating' the publication.

The database manager may for example automatically modify the media-content for the publication and/or arbitrate between instructions competing for association with one or more specifications of a media-based message and/or generate user instructions for inclusion in the publication and/or automatically determine a delivery channel for a media-based message and/or automatically provide user-sensible or user-insensible content for the publication.

According to some embodiments there is provided a system for performing instructions determined by received media-based messages, the system comprising: an interface for receiving a media-based message from a system user; a database configured to associate one or more specifications of a media-based message with one or more stored instructions; a recognition engine for identifying a correspondence between a received media-based message and the first specification of a media-based message; and a database manager for arbitrating which of a plurality of distinct candidate instructions for performance in response to an identified correspondence between a received media-based message and the first specification of a media-based message, is performed in response to an identified correspondence between the received media-based message and the first specification of a media-based message.

According to some embodiments there is provided a method comprising: adapting a database to include a first specification of a media-based message in association with one or more instructions; receiving a media-based message from a system user; identifying a correspondence between the received media-based message and the first specification of a media-based message; arbitrating which of a plurality of distinct candidate instructions for performance in response to an identified correspondence between a received media-based message and the first specification of a media-based message, is performed in response to an identified correspondence between the received media-based message and the first specification of a media-based message.

According to some embodiments there is provided a computer program for use in a system for performing instructions determined by received media-based messages, the system comprising: an interface for receiving a media-based message from a system user; a database configured to associate a first specification of a media-based message with one or more stored instructions; a recognition engine for identifying a correspondence between a received media-based message and the first specification of a media-based message; and an arbitration engine; the computer program being configured to arbitrate which of a plurality of distinct candidate instructions for performance in response to an identified correspondence between a received media-based message and the first specification of a media-based message, is performed in response to an identified correspondence between the received media-based message and the first specification of a media-based message.

According to some embodiments there is provided a database manager operable to adapt a database to include a specification of a first media-based message, wherein the database associates a plurality of stored specifications of media-based messages with respective stored instructions and wherein the database manager is configured to enable the performance of an instruction addressed by a received media-based message that corresponds with a stored specification of a media-based message by arbitrating which of a plurality of distinct candidate instructions for performance in response to an identified correspondence between a received media-based message and the first specification of a media-based message, is performed in response to an identified correspondence between the received media-based message and the first specification of a media-based message.

According to some embodiments there is provided a system for performing instructions determined by received media-based messages, the system comprising: an interface for receiving a media-based message from a system user; a database configured to associate a first specification of a media-based message with one or more stored instructions; a recognition engine configured to identify a correspondence between a received media-based message and the first specification of a media-based message and configured to identify a correspondence between specifications of a media-based messages having corresponding media content; and a database manager configured to arbitrate between corresponding specifications of media-based messages to determine what instruction to perform in response to an identified correspondence between the received media-based message and the corresponding media content.

BRIEF DESCRIPTION OF THE DRAWINGS

For a better understanding of various embodiments of the present invention reference will now be made by way of example only to the accompanying drawings in which.

DETAILED DESCRIPTION OF VARIOUS EMBODIMENTS OF THE INVENTION

Overview

The Figs schematically illustrate one example of a system (or apparatus) 20 for performing instructions 13 that are dependent upon received media-based messages 3.

Figure 1A:
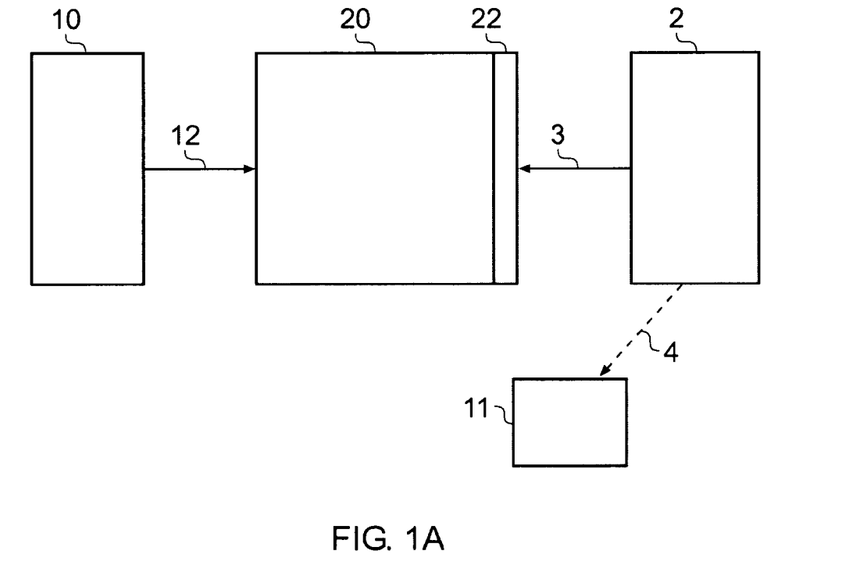
FIGS. 1A and 1B schematically illustrate examples of a system for performing instructions that are dependent upon received media-based messages.
Figure 1B:
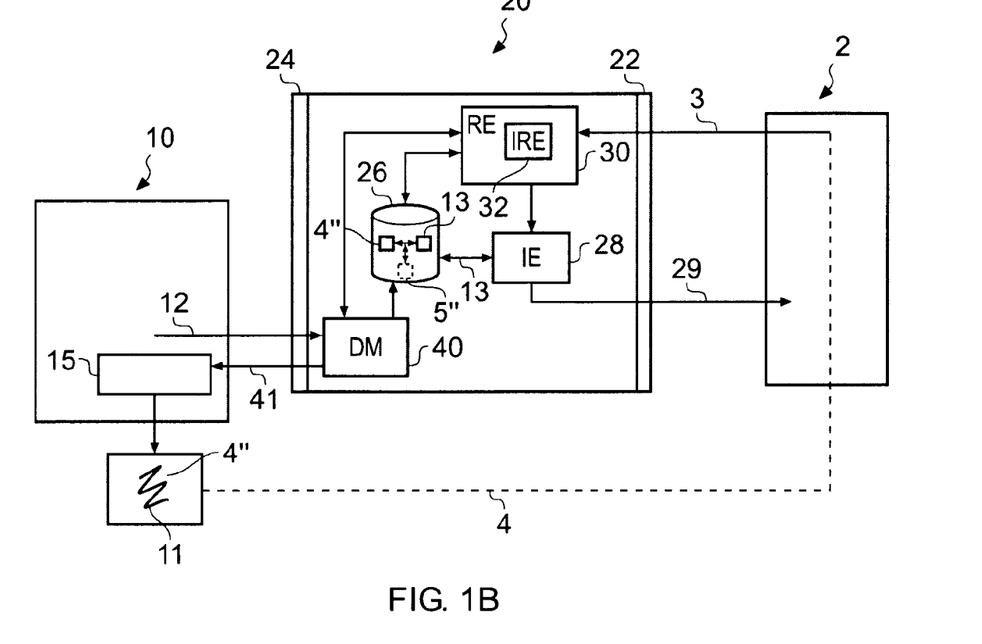

As illustrated in FIGS. 1A and 1B, the system 20 comprises: an interface 22 for receiving a media-based message 3 from a system user 2; means for identifying a correspondence between a received media-based message 3 and a stored specification of a media-based message and for performing an instruction associated with a stored specification of a media-based message for which a correspondence has been identified.

The system may be used to provide a service whereby any item 11 (e.g. a publication, sound, gesture, action, object or location) that can be recorded can be 'activated' such that if a user records 4 the item 11 or a portion of the item 11 and sends the record of it as media-content in a media-based message 3 to a specific address then a pre-defined instruction is performed.

A publication may be anything that is made available to a user. If the publication is a generated visual publication, such as an advertisement the user may use a camera mobile cellular telephone to capture an image of the generated visual publication. If the publication is an audio clip the user may use a mobile cellular telephone to record a portion of the audio.

The recorded media-content may be sent to a particular telephone number in a multimedia message (e.g. an MMS) or as a message via another specified delivery channel (e.g. a MIME email, a data packet or a streaming data packets). The performed instruction may be sending a response back to the user's mobile cellular telephone.

The system additionally allows the same user or another user 10, via 'self-service', to control 'activation'. This 'activating' user (requestor) 10 can request 12 activation of an item 11 and the system actively processes the request before activating the item.

The active processing may, for example, arbitrate between competing activation requests from different requestors.

In one example, the requestor can set-up the service for her own published media, for example. The requestor can request activation by specifying, for example, media, one of more delivery channels, an instruction and the system actively processes the request before assigning media, a delivery channel and an instruction and providing publication data to the requestor that enables manufacture and distribution of the 'activated' publication. In this example, the active processing may, for example, modify the media and/or determine a delivery channel and/or provide user-perceptible or user-imperceptible content for the activated publication and/or arbitrate between competing requests from different requestors.

A media-based message may be a message that includes media-content recorded from an 'activated' item by a system user 2. The media-content may, for example, be a digital image or a video captured by a user using a camera, an audio clip captured by a user using a microphone etc. A media-based message may be formed from a single data structure e.g. MMS or email etc or may be formed from multiple data structures e.g. streaming media or concatenated SMS etc.

Figure 2A:
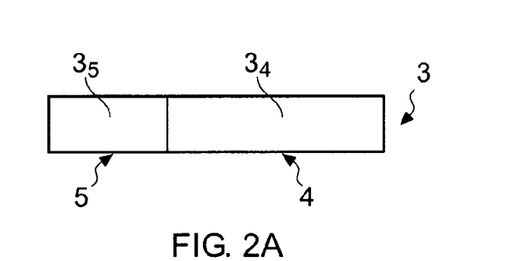
FIG. 2A illustrates an example of a media-based message.

One example of an media-based message 3 is illustrated in FIG. 2A. The media-based message 3 comprises an optional header portion $3_5$ that is dependent upon a delivery channel 5 used to deliver the message from the user 2 to the system 20 and a media portion $3_4$ that includes data representing media 4 such as, for example, an image. One example of a media-based message 3 is a multimedia messaging service (MMS) message another example may be an email.

The delivery channel 5 used to deliver a media-based message 3 may, for example, be defined by a telecommunications protocol and a destination address for the message e.g. MMS and a telephone number or it may, for example, be defined by an application that sends the message.

As illustrated in more detail in FIG. 1B, the system 20 may comprise: an interface 22 for receiving a media-based message 3 from a system user 2; a database 26 associating a plurality of specifications of media-based messages 3 with respective stored instructions 13; a recognition engine 30 for identifying a correspondence between a received media-based message 3 and a stored specification of a media-based message 3" (see FIG. 2A); and an instruction engine 28 for performing an instruction 13 associated with a stored specification of a media-based message 3" for which a correspondence has been identified.

A specification of a media-based message may specify media-content such as an image, video or audio clip. It may, in some embodiments, also additionally specify a delivery channel by which a media-message may be sent from a system user 2 to the system 20. In one particular embodiment described below a specification of a media-based message specifies an image and the image's associated delivery channel (if any).

The recognition engine 30 may help identify a correspondence between a received media-based message 3 and a stored specification of a media-based message 3" by identifying a correspondence between media-content specified by the stored specification and media-content included in the received media-based message 3.

Thus a media-based message 3 received from a user 2 is used to 'address' an instruction 13. A system user 2 can instigate performance of the instruction 13 by recording an item as media-content and sending the media-content as a media-based message 3 to the system 20.

The recognition engine 30 may, in some embodiments, be an image recognition engine. WO2006085106 describes an example of an image recognition engine. Another example of an image recognition engine may be found in Ke, and Sukthankar, "PCA-SIFT: a more distinctive representation for local image descriptors", Proc. of the CVPR, vol. 2, pp. 506-513 (2004). Video may be processed as a series of still images. In another embodiment the media may be audio. U.S. Pat. No. 5,918,223 describes an audio recognition engine. Audio watermarking is known from D. Kirovski and H. S. Malvar. *Spread Spectrum Watermarking of Audio Signals. IEEE Transactions on Signal Processing, Vol.* 51, (no. 4), pp. 1020-33, 2003. These documents are included herein by reference.

The system 20 additionally has components that allow a requestor 10 to control 'activation' of an item These system components include an interface for receiving an activation request; and a database manager. The database manager 40 is also configured to adapt the database 26 to include a specification of a new media-based message.

The database manager may arbitrate between competing requests from different requestors to activate corresponding items.

Image Addressing

An embodiment of the invention will now be described in which the media-content is an image. The media-based message 3 could be referred to as an image-based message 3. However, other embodiments may use different media-content such as audio or video.

The database 26 associates each of a plurality of specifications of media-based messages with a respective instruction 13. A specification of a media-based message specifies a media, such as image 4", and may specify one or more delivery channels. The database 26 enables an instruction 13 to be accessed using 'image addressing'. An image recognition engine 32 determines when there is a correspondence between a received image 4 and a stored image 4" and when a correspondence has been identified the instruction 13 associated with the corresponding stored image 4" is accessed and performed.

One mechanism (of many) for determining a correspondence between two images suitable for use in the image recognition engine 32 is described in detail in relation to FIG. 3 of WO2006085106 which is incorporated by reference into this document. In short, the stored image 4" is processed to create a model key which defines the interest points within the image. The database 26 may store as a 'stored image' the original image and/or the model image key. The received image 4 is processed to create a scene user key which defines the interest points of the received image 4. A putative homography is generated which maps some or all of the points of interest of the scene user key to some or all of the points of interest of a selected model key and a cost for that homography is calculated. The homography is then iteratively varied until the 'best' homography with the best cost is identified for the selected model key. If the best cost exceeds a threshold a correspondence is declared. If the best cost does not exceed a threshold, the selected model key is varied and the process for determining a best homography for the newly selected model key is repeated. A pixel by pixel verification between the images may occur before a correspondence is declared. The threshold may be varied to control the degree of similarity required for a correspondence to be declared.

It should be appreciated that a correspondence between images occurs in this example when any significant portion of one image corresponds to another significant portion of another image. Significant in this context does not necessarily mean that it occupies a large proportion of the image rather it has sufficient interest points to enable reliable image matching.

The database 26 associates each of a plurality of specifications of media-based messages with a respective instruction 13. A specification of a media-based message specifies a media, such as image 4", and may specify one or more delivery channels. Thus the database 26, in some embodiments, may associate together an image 4" and an instruction 13. The database 26, in other embodiments, may associate together an image 4", an instruction 13 and delivery channel(s) 5". The database 26 enables an instruction 13 to be accessed using 'image addressing'.

A recognition engine 30 determines when there is a correspondence between a received media-based message 3 and a stored specification of a media-based message.

An image recognition engine 32 determines when there is a correspondence between a received image 4 and a stored image 4". When a correspondence has been identified the instruction 13 associated with the stored image 4" will be accessed and performed if the delivery channel 5 by which the image 4 was received is compatible with a delivery channel 5" associated with the instruction 11 (if any).

A delivery channel recognition engine 34 may be used to determine if a delivery channel 5 by which the image 4 was received is compatible with a delivery channel 5" associated with image 4" corresponding to the received image 4. This enables the same image 4 received via different delivery channels 5 to address different instructions 13.

The instruction engine 28 then performs the instruction 13 addressed by the received image 4. The instruction may, for example, involve an internal procedure to the system 20 such as recording details of the user into a database and/or an external process such as downloading data 29 to the user 2. The data may, for example, be an SMS, MMS, ring tone, screensaver, wallpaper, URL, voucher, video clip, application data, a voice call, or a link to an external web-site etc.

Activation

The system 20 also enables third party requestors 10 to control the system 20 so that it performs a particular instruction 13 when a particular media-based message 3 is received. The system 20 is configured to actively process the requests 12 made by third party requestors 10 to control the system 20.

The active processing may involve the system 20 processing a received request 12 but with a variation or addition which improves the functioning of the system 20.

For example, a requestor 10 is able to 'activate' a particular specification of a media-based message by adapting the database 26 to include new associations between the particular specification of a media-based message and an instruction or instructions. The association of a specification of a media-based message with an instruction may include an association between an image 4" and instruction(s) 13 with or without an additional association to delivery channel(s) 5".

The system 20 has an interface 24 that receives an activation request 12 from the requestor 10 and a database manager 40 that responds to the activation request 12.

Figure 2B:
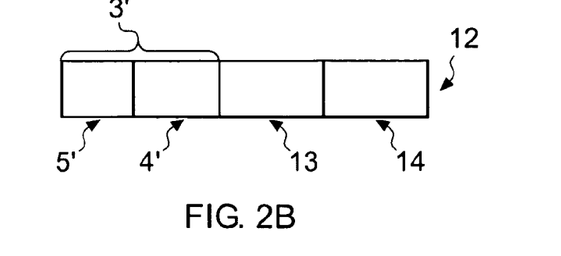
FIG. 2B illustrates an example of an activation request.

An example of an activation request 12 is illustrated in FIG. 2B. It may specify the whole or part of an media-based message 3' i.e. it may include or identify a model image 4' and it may optionally include a specification of a delivery channel 5'. A delivery channel specification specifies one or more channels by which a media-based message can be received. The specification may be of a generic form such as 'MMS' or a specific form such as MMS to a particular number or numbers. It may also include or identify an instruction 13. It may also in some embodiments identify a publication channel 14.

The included/identified image 4' is the image specified for storage in the database 26. The included instruction 13 is the instruction specified for association with that image in the database 26. A delivery channel 5' determined in accordance with the specification of delivery channel identifies the channel by which a message 3 addressing that instruction 13 should be delivered to the system 20.

In general, the database manager 40 actively and automatically processes the activation request 12. The database manager 40 may provide a fully automated mechanism for updating and managing the database 26.

The active processing may involve the system 20 processing a received request 12 but with a variation or addition which improves the functioning of the system 20. For example, a requestor 10 may be able to adapt the database 26 to include new associations between images 4" and instructions 13 with or without an additional association to a delivery channel 5".

The active processing may identify and resolve conflicting requests for the activation of the same or corresponding specifications of media-based messages.

Figure 3A:
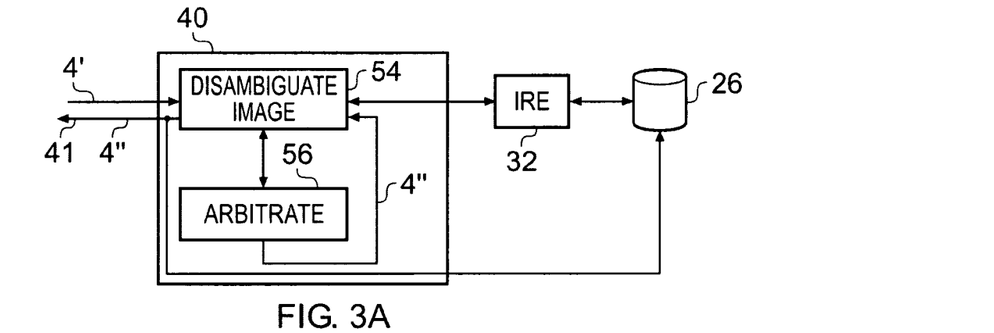
FIG. 3A schematically illustrates a process in which an activation request is processed to disambiguate that activation request from another activation request.

A conflict between activation requests occurs when the activation requests relate to the redundant or same 'addresses'. This occurs when specifications of media-based messages defined in the activation requests are not differentiable according to the current settings of a disambiguation module 54 used to disambiguate specifications of media-based messages. Specifications of media-based messages may be differentiated via the delivery channels specified. Specifications of media-based messages may be differentiated via differentiation between the media specified because, for example, the specifications include/identify different or non-corresponding model images (as illustrated in FIG. 3A). The settings of the disambiguation module may determine the degree of similarity required before model images are declared the same or corresponding.

In some, but not necessarily all, implementations an arbitration module 56 may be configured to arbitrate between conflicting activation requests by performing a manual or automatic competition such as an auction. Where such a competition takes place it is the instructions associated with the winning activation request that are executed. The arbitration may, for example, occur when a media-based message is received or when an activation request is received FIG. 3A schematically illustrates, as an example, a process in which an activation request 12 is actively processed by database manager 40 to identify and resolve conflicting requests for the activation of the same or corresponding specifications of media-based messages.

In FIG. 3A, an image disambiguation module 54 is used to detect when there is ambiguity between an image 4' of a received first activation request and an image already stored in the database 26 associated with a second, preceding, activation request such that the image recognition engine 32 does not discriminate them. The disambiguation module 54 sends the image 4' to the image recognition engine 32 where a disambiguation test is performed. For example, the image recognition engine may determine if there is a correspondence between the image 4' and another image stored in the database 26. If there is a correspondence the disambiguation test fails and an arbitration module 56 is configured to arbitrate between conflicting demands for the use of the image.

In some, but not necessarily all, implementations the arbitration module 56 is configured to arbitrate between conflicting demands for the use of an image as an address by performing a manual or automatic competition such as an auction.

In one implementation, arbitration may occur when a media-based message is received. The database manager may be configured to arbitrate using a competition, in response to an identified correspondence between a received media-based message and one or more specifications of media-based messages, which of a plurality of distinct candidate instructions associated with the one or more specifications of media-based messages for which a correspondence has been identified should be performed. In another implementation, the competition may be carried out and a winner resolved at the time when an activation request is received and a disambiguation test fails. Where arbitration is carried out at the time when an activation request is received the system might combine the corresponding specifications of media-based messages into a single specification and aggregate the instructions from both activation requests Each competitor may be given the opportunity to make a bid to have their candidate instruction addressed by an image of an item. The requestor 10 who is prepared to bid most to activate an item will win the competition and a received media-based message that includes an image that corresponds with the requestor's model image of that item will address that requestor's candidate instruction (if the media-based message is received via an appropriate delivery channel). A winning bid may secure this activation of the item for a certain period whether measured in time or executed instructions. Subsequently received media-based messages 3 comprising a corresponding image will automatically result in the instructions of the competition winner being performed.

A winning bid may be the highest value per instruction bid. It would be possible for an activation request 12 to include a bid which would be stored in the database 26 in association with the specification of the media-based message also included in the request. Each requestor may vary their bid over time or have their bid varied over time automatically. Other methods of using the bid to determine which instructions to execute are possible. For example, the winning bid might not always be the highest bid. In one example the relative size of a bid might determine the frequency at which the bid is considered a winner compared to the other bids. Also, it is possible to have multiple winners. For example, all bids above a certain threshold could be treated as winning bids.

The arbitration module 56 may alternatively or additionally be configured to arbitrate between conflicting demands for the use of the same or corresponding specification of a media-based message by modifying the image and/or the delivery channel associated with, for example, the later demand so that conflict is avoided.

In the situation where the database manager 40 is configured to process the activation request 12 to automatically generate publication data 41, the database manager 40 automatically sends the publication data 41 to the requestor 10 and it automatically adapts the database 26 so that the image 4" included in the publication 11 is associated in database 26 with an instruction 13 (and possibly a delivery channel 5"). The publication data 41 enables a requestor 10 to generate the whole or a part of a publication 11 that may be recorded by a user to define a new media-based message 3 including an image 4 of the publication 11 which can be used to address the associated instruction 13. Depending upon implementation, the publication data 41 may have different uses. In one implementation, the publication data 41 is used to aid creation of the publication 11. It may, for example, be data or instructions that are used to augment or modify existing data which is then used to create the publication 11. In another implementation, the publication data 41 may be used directly to create the publication 11.

An activation request 12 may identify a publication channel 14. The publication channel 14 identifies the channel by which the image will be published by the requestor 10 as publication 11. Publication of the image in this sense means making the image available to at least one user. This involves rendering all or part of the publication 11 using a rendering engine 15 on a display, on printed media or otherwise.

The publication channel 14 is the means by which the image is made available to the user. Typically it will be a specific marketing channel or media space such as bill board; bus shelter; bus; location; newspaper; television. Each marketing channel or media space may be further sub-divided into distinct publication channels to the point where each instance of a publication represents a distinct publication channel.

The image once published may be captured by a user using a digital camera and the captured image 4 may then be used by the user to generate an media-based message 3 for transmission to the system 20 where it addresses the instruction 13 associated with the captured image 4.

The generated publication data 41 may, for example, define a new image 4" that is better for recognition and/or that is better for disambiguation and/or identifies a publication channel and/or define a new delivery channel and/or provide user instructions.

The arbitration module 56 may, for example, modify the activation request so that it relates to an adapted image 4" and/or an adapted delivery channel 5". In this instance the modifications to the activation request are sent to the requestor 10 as publication data 41 and the database is adapted by associating the adapted image 4" (or unadapted image 4') and possibly the adapted delivery channel 5" (or unadapted delivery channel 5') with the original instruction 13. The association of the adapted image 4" (or unadapted image 4') and possibly the adapted delivery channel 5" (or unadapted delivery channel 5') is a stored specification of an media-based message.

FIG. 3A schematically illustrates a process in which an image 4' included in an activation request 12 may be processed by database manager 40 to disambiguate the image 4' from a currently stored image.

An image disambiguation module 54 is used to detect when there is ambiguity between a received image 4' and an image already stored in the database 26 such that the image recognition engine 32 does not discriminate them and is used to control modification of one or other of the images to remove the ambiguity and to enable the image recognition engine 32 to reliably discriminate the images.

The disambiguation module 54 sends the image 4' to the image recognition engine 32 where a disambiguation test is performed. For example, the image recognition engine may determine if there is a correspondence between the image 4' and another image stored in the database 26. If there is a correspondence the disambiguation test fails and a modification module 56 modifies the image 4' to create a modified image 4". The modified image 4" is then passed to the image recognition engine 32 where the disambiguation test is applied. If the test fails, the cycle of image modification and testing is repeated. If the test is passed, the modified image 4" is sent in the publication data 41 to the requestor 10 and is also stored in database 26 in association with an instruction (and possibly a delivery channel).

The modification of the image typically involves introducing or removing features of interest to the image 4'. This may, for example, be achieved using steganography or digital watermarking.

The process illustrated in FIG. 3A arbitrates between conflicting demands for the use of an image by modifying the image associated with the later demand so that conflict is avoided and/or by instigating a manual or automatic competition such as an auction as described above.

Figure 3B:
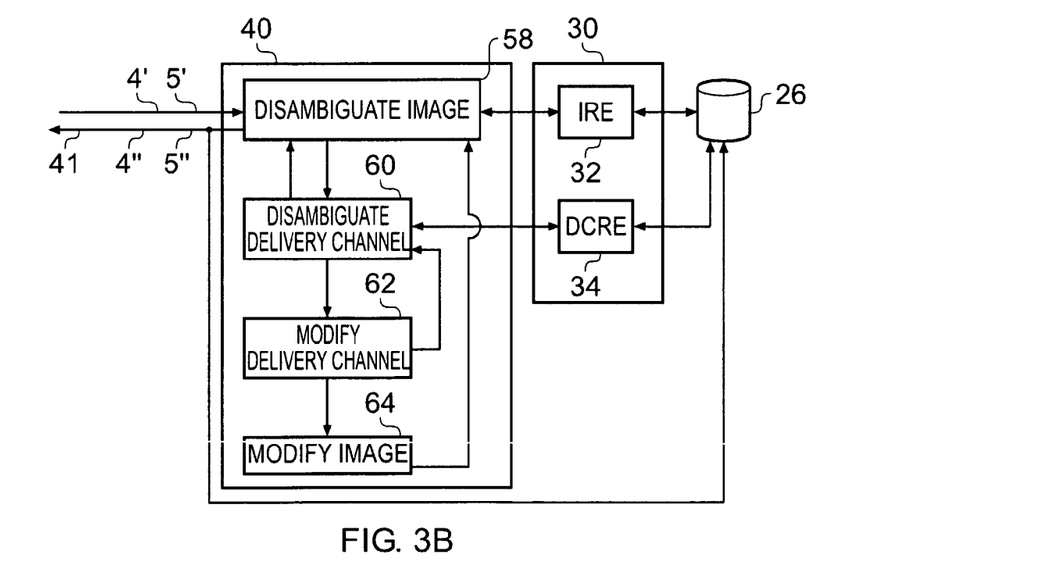
FIG. 3B schematically illustrates a process in which an activation request including media and specifying at least one delivery channel is processed to disambiguate the combination of its media and a delivery channel from a combination of delivery channel and media stored, in association.

FIG. 3B schematically illustrates a process in which an activation request 12 including an image 4' and defining a delivery channel specification 5' is processed to disambiguate the combination of image 4' and delivery channel specification 5' from a combination of delivery channel and image stored, in association, in the database 26.

An image disambiguation module 58 is used to detect when there is ambiguity between the image 4' defined in the activation request 12 and a corresponding image already stored in the database such that the image recognition engine 32 does not reliably discriminate them.

The image disambiguation module 58 sends the image 4' to the image recognition engine 32 where a disambiguation test is performed as previously described. If there is a correspondence with an image the disambiguation test fails and a delivery channel disambiguation module 60 is used to detect whether there is also ambiguity between a delivery channel 5' for image 4' specified in the activation request 12 and the delivery channel associated with the corresponding image.

If there is ambiguity in the delivery channel as well, a putative delivery channel 5' of the activation request 12 is modified at module 62 and then the delivery channel disambiguation test is repeated at module 60. If the test fails, the cycle of putative delivery channel modification and testing is repeated until all putative delivery channel possibilities are exhausted. If the test is passed, the current putative delivery channel 5" is sent in the publication data 41 to the requestor 10 and is also stored in database 26 in association with an instruction and the image 4'. A putative delivery channel may be limited to one of those defined in the activation request 12. In some embodiments, a putative delivery channel may be different to the delivery channel or channels specified in the activation request 12.

If all the delivery channel possibilities are exhausted, the image 4' of the activation request 12 is modified at module 64 and then the image disambiguation test is repeated at module 58. If the test fails, the process moves to module 60 and if the test is passed, the modified image 4" is sent in the publication data 41 to the requestor 10 and is also stored in database 26 in association with an instruction and the original delivery channel 5' or modified delivery channel 5".

The database manager 40 may therefore modify either one or both of the image 4' and delivery channel 5' in the activation request 12 so that the combination of image and delivery channel can uniquely identify an instruction within the database 26.

The modification of the image typically involves introducing or removing features of interest to the image 4'. This may, for example, be achieved using steganography or digital watermarking.

In one embodiment, an activation request 12 may define a plurality of delivery channels 5'. The database manager 40 may select one of the delivery channels which avoids ambiguity. The selected delivery channel 5" is sent in the publication data 41 to the requestor 10 and is also stored in database 26 in association with an instruction and the image 4'.

Although the process illustrated in FIG. 3B performs an image ambiguity test followed by a delivery channel ambiguity test in other embodiments this order may be reversed.

Figure 3C:
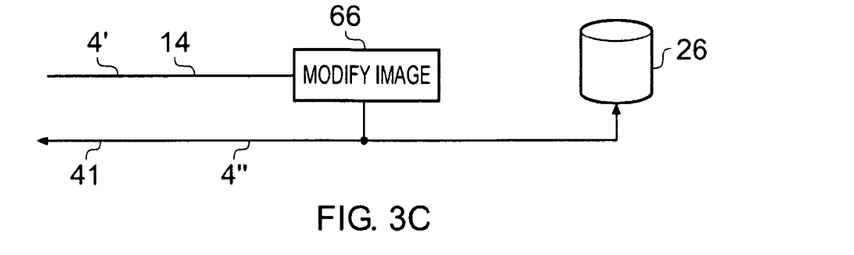
FIG. 3C schematically illustrates a process in which media included in an activation request is processed to include an identifier of the publication channel.

FIG. 3C schematically illustrates a process in which an image 4' included in an activation request 12 is processed by the database manager 40 to include a tracking code such as, for example, an identifier of the publication channel 14.

The publication channel 14 is identified from the activation request 12 and the image 4' is modified at module 66 to include features that identify the publication channel 14. This may be achieved using steganography or digital watermarking.

The modified image 4" is then stored in the database 26 in association with an instruction 13 and is also sent to the requestor 10 in the publication data 41.

The modification of the image 4' typical comprises the introduction of a tracking code or visual marker such as a pixel pattern that is recognizable by the image recognition engine 32, when the image is received in an media-based message 3 from a user 2 but may or may not be discernible by the human eye. The system 20 is therefore able to discriminate the publication channel by which the user acquired the image.

The pixel patterns may be patterns that are repeated throughout the image so that even if only a portion of the image is received in a media-based message the pattern can still be recognized and the publication channel identified.

The pixel pattern may be a pattern that extends over a large area with redundancy so that even if only a portion of the image is received in an media-based message the pattern can still be recognized and the publication channel identified.

It is apparent that the number of possible publication channels is limited only by the number of ways in which a distinct pixel pattern or other distinct publication identifiers can be incorporated within the image.

The system 20 may store statistical data identifying which publication channels are most effective. It may send this data to the requestor 10.

Figure 3D:
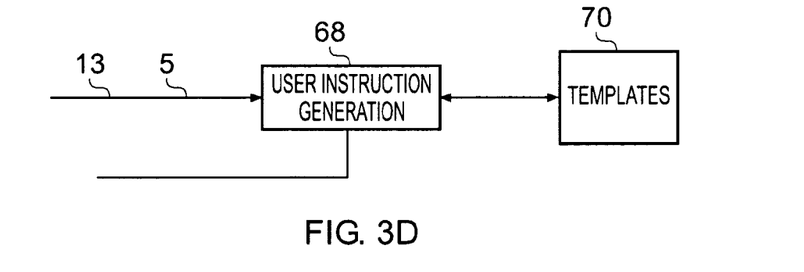
FIG. 3D schematically illustrates a process in which an activation request is processed to generate user readable content that identifies any one or more of a delivery channel and an instruction.

FIG. 3D schematically illustrates a process in which an activation request 12 is processed by the database manager 40 to generate user readable content that identifies to a user any one or more of a delivery channel 5 and an instruction 13. The user readable content is then included in the publication data 41 for eventual inclusion as user instructions in the publication 11.

The delivery channel may, for example, be the original delivery channel 5' or one of the original delivery channels 5' specified in the received activation request 12 or a modified delivery channel 5" (as described with reference to FIG. 3B).

A module 68 receives an instruction 13 and a delivery channel 5. It accesses a data structure 70 which generates different text (or graphics) for each different instruction 13 and which generates different text (or graphics) for each different delivery channel.

For example, the data structure 70 may be a template "Picture this! Take a photo [A] [B]. If the delivery channel 5 is MMS then the field [A] may read "and send an MMS to 01234567". If the instruction 13 is for the system to download a mobile telephone ring tone to the user, then the field [B] may read "to get a ring tone".

Figure 3E:
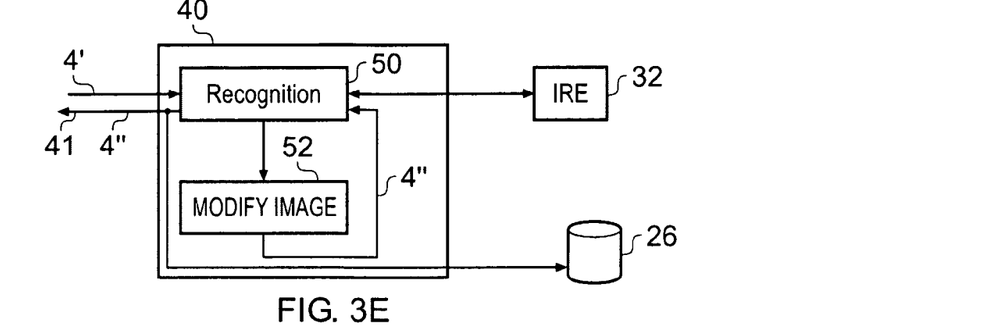
FIG. 3E schematically illustrates a process in which media included in an activation request is processed to increase its recognizability.

FIG. 3E schematically illustrates a process in which an image 4' included in an activation request 12 is processed by database manager 40 to increase its recognizability.

A recognition module 50 sends the image 4' to the image recognition engine 32 where a recognition test is performed. For example, the image recognition engine may determine the number of points of interest. If the number of points of interest is too low the recognition test fails and the modification module 52 modifies the image to create a modified image 4". The modified image is then passed to the image recognition engine 32 where the recognition test is applied. If the test fails, the cycle of image modification and testing is repeated. If the test is passed, the modified image 4" is sent in the publication data 41 to the requestor 10 and is also stored in database 26 in association with an instruction 13 (and possibly a delivery channel 5").

The modification of the image typically involves introducing features of interest to the image 4'. This may, for example, be achieved using steganography or watermarking. It will therefore be appreciated that the generated publication data 41 may, for example, define a new image 4" that is better for recognition and/or that is better for disambiguation and/or that identifies a publication channel and/or defines a new delivery channel and/or provides user instructions.

Figure 4:
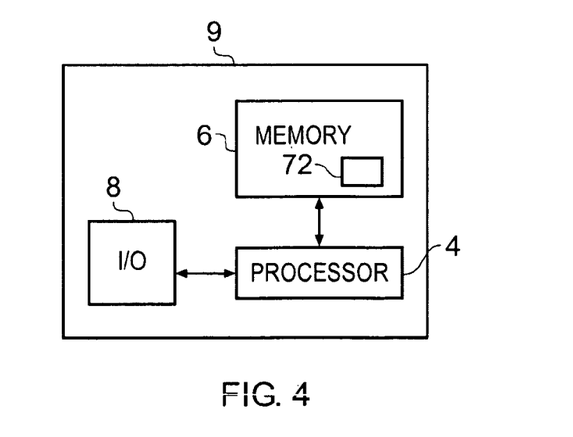
FIG. 4 schematically illustrates an apparatus that may be used as the system, used as a user apparatus or used as a requestor apparatus.

The active processing by the database manager 40 may, for example, modify the activation request so that it relates to an adapted image 4" and/or an adapted delivery channel 5". In this instance the modifications to the activation request are sent to the requestor 10 as publication data 41 and the database is adapted by associating the adapted image 4" (or unadapted image 4') and possibly the adapted delivery channel 5" (or unadapted delivery channel 5') with the original instruction 13. The association of the adapted image 4" (or unadapted image 4') and possibly the adapted delivery channel 5" (or unadapted delivery channel 5') is a stored specification of an media-based message FIG. 4 schematically illustrates, as an example, an apparatus 9 that may be used as the system 20, used as a user apparatus or used as a requestor apparatus.

The apparatus 9 is a computer with communication means. It comprises a processor 4, a memory 6 comprising a computer program 7 and an input/output interface 8. Only as many functional features are described as are necessary to perform the above-mentioned processes.

The processor 4 is arranged to read from and write to the memory 6 and is arranged to provide data to the input/output interface and receive data from the input/output interface. The processor 4 may be any suitable processor or combination of processors and the memory 6 may be implemented as one or more memory devices. The input/output interface may be configured to use one or more telecommunication protocols. For example, it may be a network adapter, a router, a modem or a wireless transceiver such as a WLAN transceiver or a mobile cellular telephone transceiver.

Referring to FIG. 1B, some or all of the database manager 40, the recognition engine (and the delivery channel recognition engine, if present), and the instruction engine may be implemented using the computer program 7 as software engines. The modules of the database manager 40 described in relation to FIGS. 3A to 3E may typically be implemented in software. The computer program instructions 7 provide the logic and routines that enables the apparatus 9 to perform the methods illustrated in those Figs.

The computer program 7 includes computer program instructions that enable the processing of an activation request for arbitration and/or to generate publication data that enables a requestor to generate a publication that may be recorded by a user to define a media-based message, that enable sending the publication data to the requestor; and that enable adapting the database to include a specification of the media-based message.

The computer program instructions 7 may arrive at the apparatus 9 via an electromagnetic carrier signal or be copied from a physical entity such as a computer program product, a computer readable product, a memory device or a record medium such as a CD-ROM or DVD.

The blocks illustrated in the Figs may represent steps in a method and/or sections of code in the computer program and/or hardware. The illustration of a particular order to the blocks does not necessarily imply that there is a required or preferred order for the blocks and the order and arrangement of the block may be varied.

Although embodiments of the present invention have been described in the preceding paragraphs with reference to various examples, it should be appreciated that modifications to the examples given can be made without departing from the scope of the invention as claimed.

An activation request 12 may specify not only media-based message 3' but also it may specify a similarity value that defines the degree of similarity required between media content of a received media-based message and media content of the specified media-based message for a correspondence to be declared. The similarity value may, for example, set the threshold of the image recognition engine.

The similarity value may additionally or alternatively also define the degree of similarity required between the media content of specifications of media-based messages for there to be a conflict because they have the same or corresponding specifications of media-based messages.

Features described in the preceding description may be used in combinations other than the combinations explicitly described.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A computer system for performing instructions determined by received media-based messages, the computer system comprising:
    at least one processor and at least one memory configured to enable:
        a database manager configured to adapt a database to associate a first specification of a media-based message with a plurality of instructions in response to requests from different parties;
        an interface configured to receive a media-based message from a system user; and
        a recognition engine configured to identify a correspondence between a received media-based message and the first specification of a media-based message, the recognition engine-comprising an image recognition engine configured to identify an interest point correspondence between an image comprised in a received media-based message and an image associated with the first specification of a media-based message;
        wherein the database manager is configured to arbitrate which of the plurality of instructions associated with the first specification of a media-based message for which an interest point correspondence has been identified, is performed.

2. A computer system as claimed in claim 1, comprising the database, wherein the database stores a plurality of corresponding first specifications of media-based messages each of which is associated with a different instruction, wherein one of the plurality of corresponding first specifications is associated with a first instruction in response to a request from a first party and another one of the plurality of corresponding first specifications is associated with a second instruction in response to a request from a second party, and wherein the second party is different from the first party.

3. A computer system as claimed in claim 1, comprising the database, wherein the database stores a single first specification of a media-based message which is associated with a plurality of different instructions including a first instruction, in response to a request from a first party, and a second instruction, in response to a request from a second party, and wherein the second party is different from the first party.

4. A computer system as claimed in claim 1, wherein the database manager is configured to adapt the database to associate bids with at least some of the plurality of instructions associated with the first specification of a media-based message, in response to requests from different parties;
    wherein the database manager is configured to arbitrate, using the bids, which of the plurality of instructions associated with the first specification of a media-based message for which a correspondence has been identified, is performed.

5. A computer system as claimed in claim 4, further comprising a request interface for receiving requests from different parties including at least one bid.

6. A computer system as claimed in claim 1, wherein the recognition engine is configured to identify a correspondence between a subject media-based message and the first specification of a media-based message by identifying both a correspondence between an image comprised in the subject media-based message and an image associated with the first specification of a media-based message and also a match between a delivery channel of the subject media-based message and a delivery channel associated with the first specification of a media-based message, the recognition engine comprising:
    an image recognition engine configured to identify a correspondence between an image comprised in the subject media-based message and an image associated with the first specification of a media-based message and
    a delivery channel recognition engine configured to identify a match between a delivery channel of the subject media-based message and the delivery channel associated with the first specification of a media-based message.

7. A computer system for performing instructions determined by received media-based messages, the computer system comprising at least one processor and at least one memory configured to enable:
    a request interface configured to receive requests from different parties;

a database manager configured to adapt a database, in response to received requests from different parties, to associate specifications of media-based messages with instructions;

a message interface for receiving a user-captured media-based message comprising an image from a camera enabled mobile device of a system user; and a recognition engine configured to identify a correspondence between a received media-based message and one of the specifications of media-based messages associated in the database, the recognition engine comprising an image recognition engine configured to identify an image correspondence between an image comprised in a received media-based message and an image associated with the first specification of a media-based message when a significant portion of the image associated with the first specification of a media-based message corresponds to a portion of the image comprised in a received media-based message;

wherein the database manager is configured to arbitrate which of the instructions is performed in response to an identified image correspondence between the received media-based message and the specifications of media-based messages.

8. A computer system as claimed in claim 7, wherein the database manager is configured to associate the a first specification of a media-based message with a plurality of distinct stored candidate instructions and wherein the database manager is configured to arbitrate, in response to an identified correspondence between the received media-based message and the first specification of a media-based message, which of the plurality of distinct candidate instructions is performed.

9. A computer system as claimed in claim 8, wherein the database manager is configured to arbitrate, before the media-based message has been received, which of the plurality of distinct candidate instructions is associated with a first specification of a media-based message for performance in response to an identified correspondence between a received media-based message and the first specification of a media-based message.

10. A computer system as claimed in claim 7, wherein the recognition engine is configured to identify a correspondence between specifications of media-based messages and the database manager is configured to arbitrate between corresponding specifications of media-based messages.

11. A computer system as claimed in claim 7, wherein the database manager is configured to arbitrate using a result from a competition between corresponding specifications of media-based messages.

12. A computer system as claimed in claim 11, wherein the competition is an auction.

13. A computer system as claimed in claim 7, wherein the database manager is configured to arbitrate by adapting a specification of a media-based message.

14. A computer system as claimed in claim 7 further comprising a request interface for receiving activation requests from different parties; wherein the database manager is configured to process an activation request from a party and include a specification of a new media-based message.

15. A computer system as claimed in claim 7, wherein the recognition engine comprises a media recognition engine configured to identify a correspondence between media-content comprised in a media-based message and media-content comprised in the specification of a media-based message in the database and the media recognition engine is configured to perform a disambiguation test by searching for a correspondence, if any, between subject media-content and media-content stored in the database.

16. A computer system as claimed in claim 7, wherein the recognition engine comprises:

an image recognition engine configured to identify a correspondence between an image comprised in a received media-based message and an image comprised in a stored specification of a media-based message and a delivery channel recognition engine configured to identify a match between a delivery channel of a received media-based message and the delivery channel of a stored specification of a media-based message, and wherein a correspondence between a first received media-based message and a stored specification of a second media-based message requires a correspondence between an image comprised in the first media-based message and an image comprised in the specification of the second media-based message and also a match between a delivery channel of the first media-based message and the delivery channel of the specification of the second media-based message, and the recognition engine is configured to perform a disambiguation test by searching for a correspondence, if any, between a subject media-based message and specifications of media-based messages stored in the database.

17. A method comprising:

in response to requests received from different parties, adapting a database to include an association between one or more specifications of image-based messages and different instructions;

receiving an image-based message from a system user;

identifying a correspondence between the received image-based message and at least one of the one or more specifications of image-based messages by identifying an interest point correspondence between an image comprised in the received image-based message and an image associated with the at least one specification of an image-based message; and arbitrating, using a processor, which of the associated different instructions is performed in response to an identified interest point correspondence between the received image-based message and the one or more specifications of image-based messages.

18. A method as claimed in claim 17, further comprising using bids received from the different parties to enable said arbitrating.

19. A method as claimed in claim 17, wherein identifying a correspondence between a received image-based message and a specification of an image-based message comprises:

identifying both a correspondence between an image comprised in the image-based message and an image associated with the specification of an image-based message and also a match between a delivery channel of the image-based message and a delivery channel associated with the specification of the image-based message.

20. A computer system comprising at least one processor and at least one memory configured to enable:

a database manager configured to enable user controlled activation of an item, by adapting a database, in response to an activation request from a first user that identifies a first instruction and includes a first image of the item to be activated or includes an identification of a first image of the item to be activated, to activate the item by associating a first specification of a media-based message based upon the first image of the item with the first instruction, wherein the first specification of the media-based message enables determination of interest point correspondence between the first image of the activated item on which the first specification of a media-based message is based and a captured image comprised in a media-based message subsequently received from a system user, and consequential addressing of the first instruction associated with the first specification of a media-based message in the database instigating performance of the first instruction; and wherein the first instruction causes sending a response back to the system user that sent the media-based message, the response not being a modified version of the media-based message received from the system user and not being a modified version of an image received from the system user;

an interface configured to receive a media-based message sent from a system user to a specific address to cause the performance of a instruction pre-defined in the database by association with a specification of a media-based message, the media-based message comprising a captured image of an activated item captured by the system user that, via interest point correspondence between an image of an activated item on which a particular specification of a media-based message in the database is based and the captured image, addresses an instruction associated in the database with the particular specification of a media-based message instigating performance of the associated instruction; and an image recognition engine configured to identify an interest point correspondence between the captured image comprised in the received media-based message and the first image of the activated item on which the first specification of a media-based message is based, wherein successfully determining interest point correspondence between the first image of the activated item on which the first specification of a media-based message is based and the captured image comprised in the received media-based message causes addressing of the instruction associated with the first specification of a media-based message in the database instigating performance of the instruction associated with the first specification of the media-based message in the database, wherein the performed instruction causes sending a response back to the system user, the response not being a modified version of the media-based message received from the system user and not being a modified version of an image received from the system user;

wherein the database manager is configured to arbitrate multiple activation requests that identify different instructions and include an image of the same item to be activated or identification of an image of the same item to be activated, to determine which of the different instructions associated or potentially associated with the first specification of a media-based message for which an interest point correspondence has been identified, is performed, wherein the performed instruction causes sending a response back to the system user, the response not being a modified version of the media-based message received from the system user and not being a modified version of an image received from the system user.

21. A computer system as claimed in claim 20 comprising the database, wherein the database associates different specifications of a media-based message with different instructions, each specification being based upon an image of a different publication.

22. A computer system as claimed in claim 20, wherein the image recognition engine is configured to identify an interest point correspondence by iteratively varing an homography that maps some or all of the points of interest of images of activated items on which specifications of a media-based message in the database are based and some or all of the points of interest of the captured image received from a system user to obtain a best homography.

* * * * *